US009350408B2

(12) United States Patent
Cipolla et al.

(10) Patent No.: US 9,350,408 B2
(45) Date of Patent: May 24, 2016

(54) MANPACK TWO-WAY RADIO MOUNT SYSTEM

(71) Applicant: HARRIS CORPORATION, Melbourne, FL (US)

(72) Inventors: David Cipolla, Macedon, NY (US); Jason Scott, W. Henrietta, NY (US); Howard M. Sheehan, Bloomfield, NY (US)

(73) Assignee: Harris Corporation, Melbourne, FL (US)

( * ) Notice: Subject to any disclaimer, the term of this patent is extended or adjusted under 35 U.S.C. 154(b) by 40 days.

(21) Appl. No.: 14/308,762

(22) Filed: Jun. 19, 2014

(65) Prior Publication Data

US 2015/0366308 A1 Dec. 24, 2015

(51) Int. Cl.
*A45F 3/04* (2006.01)
*H04B 1/3827* (2015.01)

(52) U.S. Cl.
CPC .................... *H04B 1/3827* (2013.01)

(58) Field of Classification Search
CPC ............. A45C 11/00; A45C 2011/001; A45C 2200/10; A45C 2011/002; A45C 2011/003; A45F 2200/05; A45F 2200/0508; A45F 2200/0516; A45F 2200/0525
USPC ......... 224/645, 930, 650, 651, 545, 547, 555, 224/929
See application file for complete search history.

(56) References Cited

U.S. PATENT DOCUMENTS

| 1,786,254 | A | * | 12/1930 | Meehan | A01K 97/10 224/222 |
| 2,420,673 | A | * | 5/1947 | Monrad | B64D 43/00 108/43 |
| 3,193,232 | A | * | 7/1965 | Hatcher | B62J 11/00 224/420 |
| 3,380,698 | A | * | 4/1968 | Goldberg | B62J 11/00 224/420 |
| 3,827,772 | A | * | 8/1974 | Johnson | B60R 11/02 224/540 |
| 3,984,161 | A | * | 10/1976 | Johnson | B60R 11/02 224/540 |
| 4,264,024 | A | * | 4/1981 | Harris, Jr. | A24F 9/14 131/260 |
| 4,775,083 | A | * | 10/1988 | Burger | A45F 5/02 224/240 |
| 4,858,798 | A | * | 8/1989 | Siddoway | A45F 5/02 224/240 |
| 4,934,573 | A | * | 6/1990 | Jaeger | A45F 3/08 224/153 |
| 4,972,981 | A | * | 11/1990 | Gex | A45F 3/08 224/250 |
| 5,004,105 | A | * | 4/1991 | Freadman | A45C 7/0027 206/320 |
| 5,584,423 | A | * | 12/1996 | Wang | A45F 5/021 224/197 |
| 5,653,367 | A | * | 8/1997 | Abramson | A45F 3/14 224/197 |

(Continued)

*Primary Examiner* — Nathan J Newhouse
*Assistant Examiner* — Jennifer N Zettl
(74) *Attorney, Agent, or Firm* — Fox Rothschild LLP; Robert J. Sacco; Carol E. Thorstad-Forsyth

(57) ABSTRACT

A mount system (10) for a portable radio. The mount system (10) includes a base member (20) which defines a support surface (22) with a given perimeter and a skirt depending from the support surface (22) over at least a portion of the given perimeter. At least one connecting mechanism is defined by the base member. A cover member (50) including a plate member (52) is interconnected to the base member such that a radio receiving space is defined between the plate member (52) and the support surface (22).

17 Claims, 5 Drawing Sheets

(56) References Cited

U.S. PATENT DOCUMENTS

| | | | | |
|---|---|---|---|---|
| 5,775,497 | A * | 7/1998 | Krulik | A45C 13/002 190/102 |
| 5,941,434 | A * | 8/1999 | Green | A45F 5/02 224/195 |
| 5,988,469 | A * | 11/1999 | Musacchia | A01M 31/004 108/43 |
| 6,095,270 | A * | 8/2000 | Ishikawa | B62H 5/00 180/220 |
| D447,864 | S * | 9/2001 | Casparian | D3/218 |
| 6,739,486 | B2 * | 5/2004 | Winkler | A01C 7/02 222/183 |
| 6,772,879 | B1 * | 8/2004 | Domotor | A45C 11/00 206/320 |
| 6,892,880 | B2 * | 5/2005 | Nieves | A45C 11/00 206/305 |
| 6,932,309 | B1 * | 8/2005 | Corey | B60R 11/0241 224/483 |
| 7,099,710 | B1 * | 8/2006 | Faillance | A45F 5/00 455/575.1 |
| 7,159,902 | B2 * | 1/2007 | Carty | B60R 11/00 224/403 |
| 7,464,975 | B1 * | 12/2008 | Cox | A45C 11/24 294/138 |
| 7,810,683 | B2 * | 10/2010 | Chan | A45F 5/00 224/221 |
| 7,838,142 | B2 * | 11/2010 | Scheucher | H01M 2/1077 180/68.5 |
| 8,308,033 | B2 * | 11/2012 | Case | A45F 5/02 224/197 |
| 8,631,980 | B2 * | 1/2014 | Youssefi-Shams | A45F 5/02 224/197 |
| D698,542 | S | 2/2014 | January | |
| 2001/0029170 | A1 * | 10/2001 | Fujihashi | H04M 1/05 455/575.1 |
| 2002/0074370 | A1 * | 6/2002 | Quintana | A45F 3/14 224/262 |
| 2005/0045681 | A1 * | 3/2005 | Hancock | B60R 11/0205 224/401 |
| 2005/0189385 | A1 * | 9/2005 | Dreyer | A45F 5/00 224/148.7 |
| 2006/0249632 | A1 * | 11/2006 | McKelvey | B60R 11/02 248/27.1 |
| 2008/0223889 | A1 * | 9/2008 | Rossell | A44C 5/0007 224/222 |
| 2010/0080399 | A1 * | 4/2010 | Pfau | B60H 1/00764 381/71.4 |
| 2010/0176169 | A1 * | 7/2010 | Lovett | B60R 9/065 224/413 |
| 2010/0236885 | A1 * | 9/2010 | Scicluna | A45C 7/0054 190/109 |
| 2010/0243691 | A1 * | 9/2010 | Salisbury | B62J 1/12 224/413 |
| 2011/0031287 | A1 * | 2/2011 | Le Gette | F16M 11/04 224/101 |
| 2011/0034221 | A1 * | 2/2011 | Hung | A45C 11/00 455/575.8 |
| 2013/0021750 | A1 * | 1/2013 | Senatori | G06F 1/206 361/695 |
| 2013/0248569 | A1 * | 9/2013 | Hsu | B62J 11/00 224/440 |
| 2013/0284772 | A1 * | 10/2013 | Paugh | A45F 5/004 224/162 |

* cited by examiner

MANPACK TWO-WAY RADIO MOUNT SYSTEM

BACKGROUND OF THE INVENTION

1. Statement of the Technical Field

The inventive arrangements relate to modular radios. More specifically, the inventive arrangements relate to a mount system for modular radios.

2. Description of the Related Art

Military personnel and other individuals operating in remote outdoor environments often use field radios as a means of communication, either via satellite, or to a distant station. These field radios are generally comprised of a transceiver unit including electronic circuitry for transmission and receipt of communications, with control knobs or other means for activating and adjusting the unit input and output. Dials or other visual indicators are also included to enable the operator to readily determine the state of the unit. The radio also includes an antenna and an operator handset that are connected by an antenna cable and a handset cable, respectively, to the transceiver unit.

In use, the radios typically are utilized with a mount and/or pouch. Current mounts or pouches tend to disrupt natural convection used to cool radios, thereby requiring additional cooling means, for example, wet towels or cool packs. Additionally, current radio mounts are generally backpack specific and limit the configuration that can be carried. For example, different mount configurations may be necessary for a tethered battery solution versus a unit including a battery box. Furthermore, Army, SOCOM, Marines, etc. all have different preferences on how to carry a manpack radio.

There is a need for a universal mount system that can be mounted or used on various backpacks or carrying devices and can be used with various radios.

SUMMARY OF THE INVENTION

Embodiments of the invention concern a mount system for a portable radio. The mount system includes a base member which defines a support surface with a given perimeter and a skirt depending from the support surface over at least a portion of the given perimeter. At least one connecting mechanism is defined by the base member. A cover member including a plate member is interconnected to the base member such that a radio receiving space is defined between the plate member and the support surface.

Embodiments of the invention also concern a mount system for a portable radio including a base member defining a support surface with a given perimeter and a skirt depends from the support surface over at least a portion of the given perimeter and a plurality of ribs depend from the support surface within the skirt. Lower edges of the ribs and the skirt define a contact surface spaced from the support surface. A connection assembly is configured to connect the portable radio to the support surface.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

The exemplary embodiments of the invention are described herein employing a type of UHF, VHF-FM, and SATCOM combat net radio known as a two-channel radio manpack from the assignee of the current application, Harris Corporation of Melbourne, Fla. It is recognized that the illustrated radio is for exemplary purposes only, and that the mount system according to embodiments of the invention may be utilized with various radios.

Figure 1:
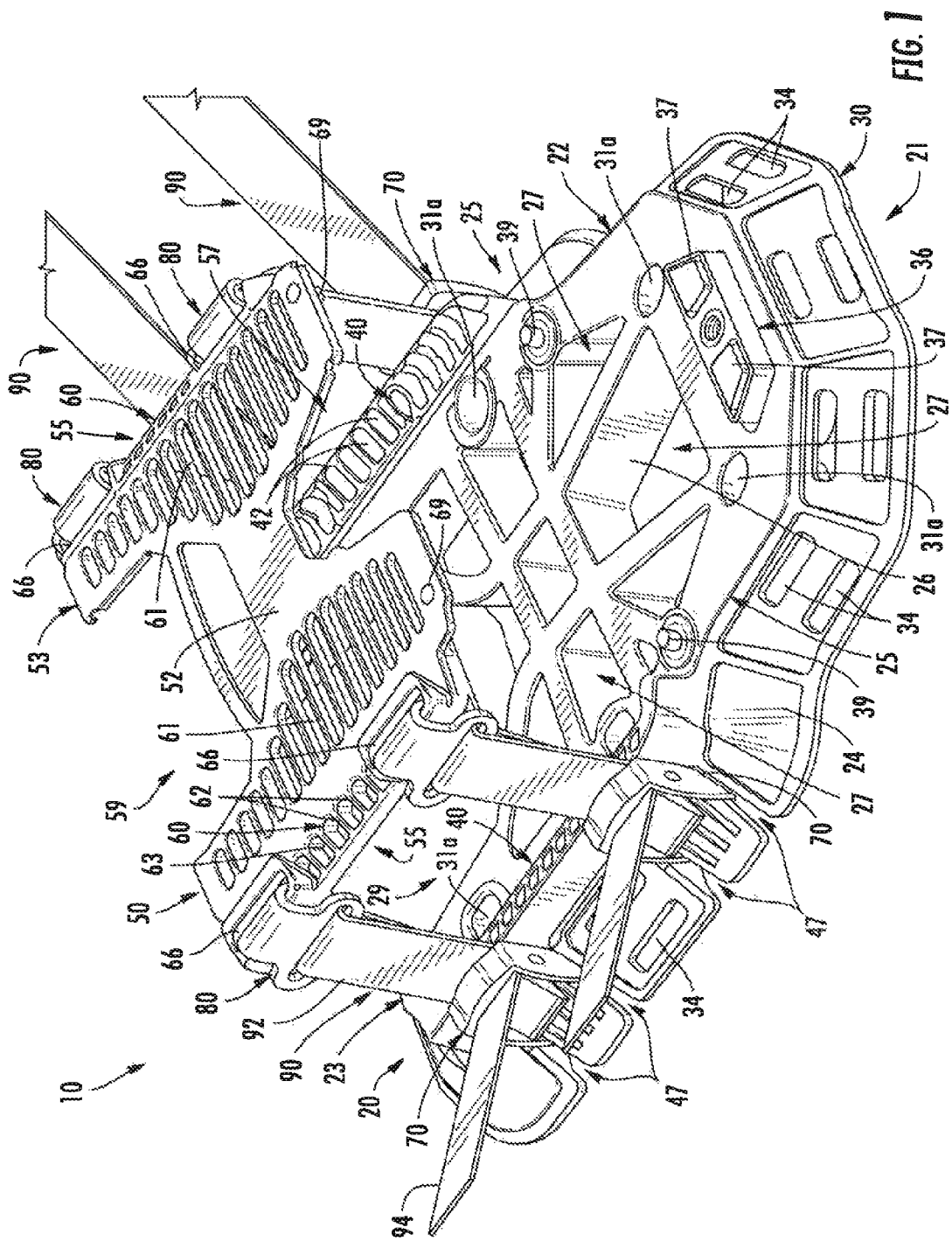
FIG. 1 is a perspective view of an exemplary mount system in accordance with an embodiment of the invention.

Referring now to FIGS. 1-4, a mount system 10 in accordance with an exemplary embodiment of the invention will be described. The exemplary mount system 10 generally comprises a base member 20 and a cover member 50 interconnected via adjustable straps 90. The adjustable straps 90 facilitate adjustment of the space between the cover member 50 and a support surface 22 of the base member 20. As illustrated in FIG. 1, the cover member 50 is spaced from the support surface 22 such that a radio unit (not shown) may be positioned therebetween. When a radio unit or the like is not mounted within the mount system 10, the straps 90 may be adjusted such that the cover member 50 is adjacent the support surface 22 to minimize the size of the mount system 10 for storage and transport.

Figure 2:
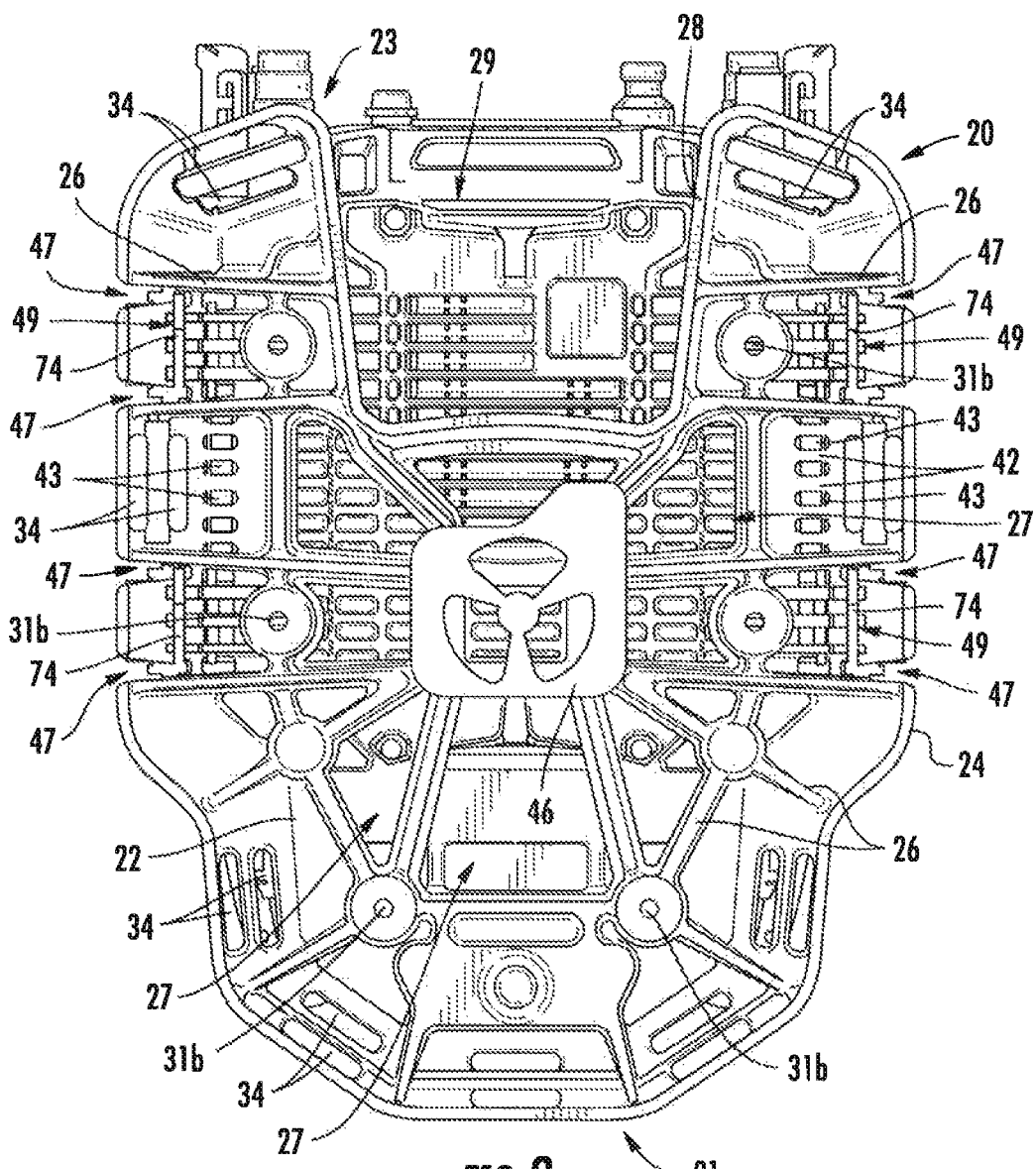
FIG. 2 is a bottom plan view of the mount system of FIG. 1.
Figure 6:
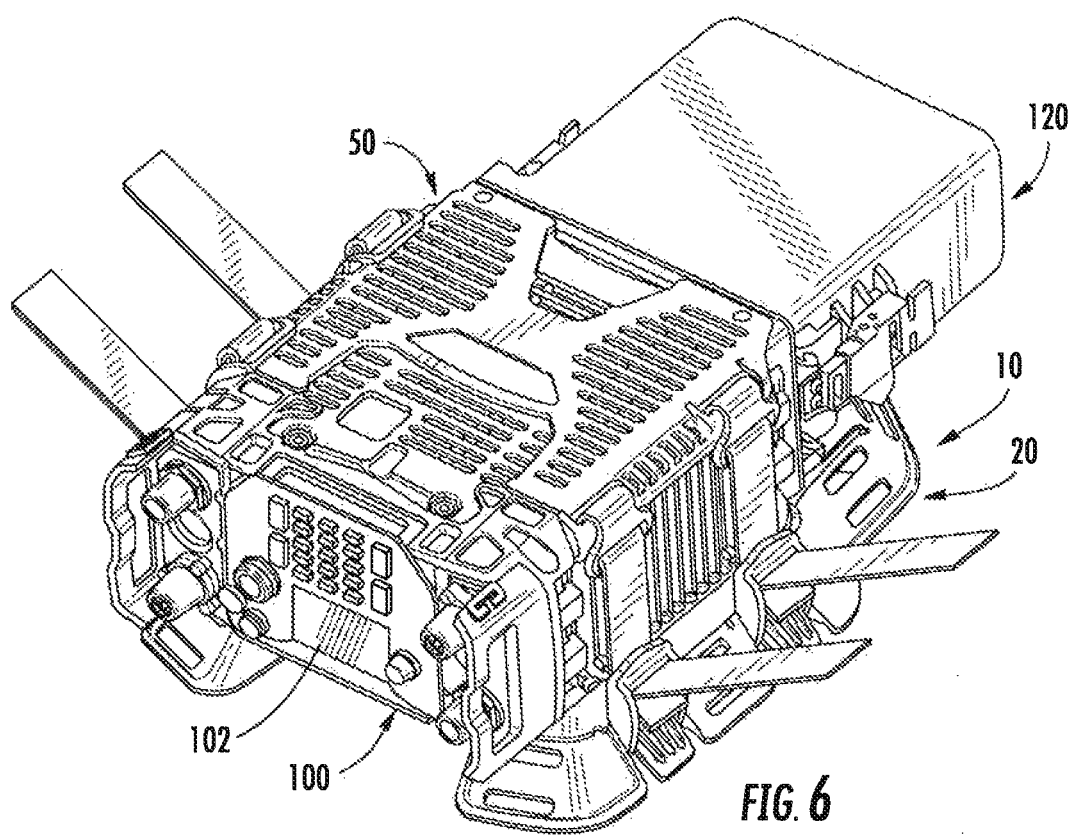
FIG. 6 is a perspective view of the mount system of FIG. 1 with an exemplary radio and battery positioned therein in a first orientation.
Figure 8:
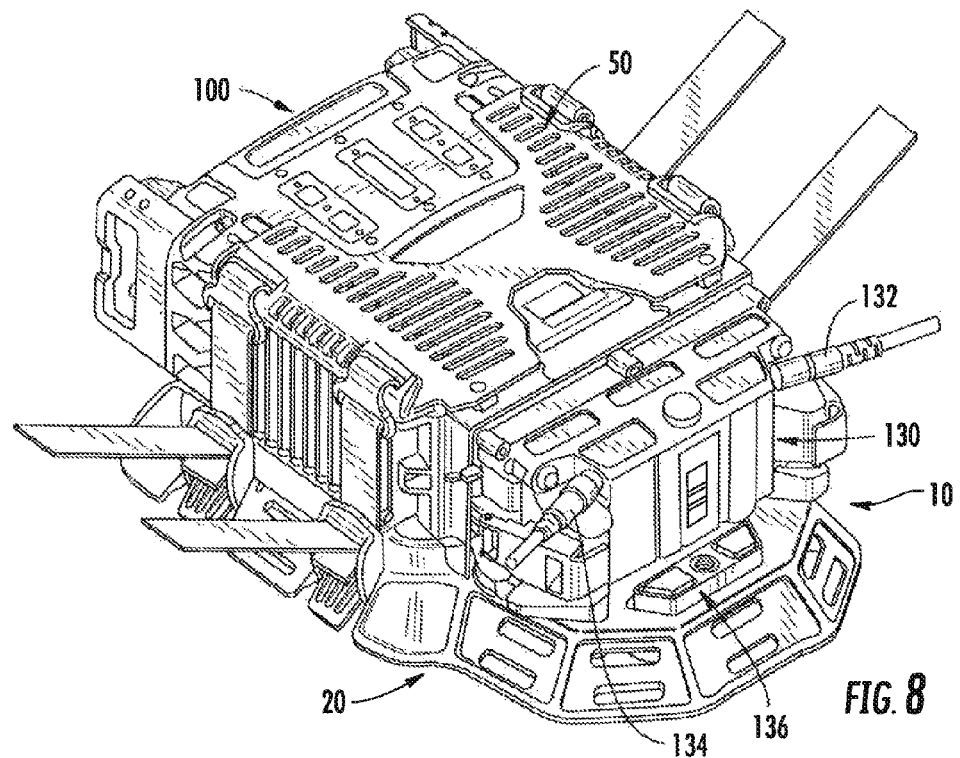
FIG. 8 is a perspective view of the mount system of FIG. 1 with an exemplary radio and battery eliminator positioned therein.

Referring to FIGS. 1 and 2, an exemplary base member 20 will be described. The exemplary base member 20 is manufactured from a nitrogen infused plastic, however, other rigid and semi-rigid materials may be utilized. The support surface 22 is generally a planar surface extending from a narrow end 21 to a wide end 23 with lateral sides 25 therebetween. With reference to FIGS. 6 and 8, the wide end 23 is configured to support the radio unit 100 while the narrow end 21 is configured to support the battery 120 or the battery eliminator 130. A reversible battery snubber 36, configured to alleviate the rise of voltage or current, is positioned on the narrow end 21 such that the contacts 37 will engage a battery 120 if such is connected to the radio unit 100. The configuration of the support surface 22 is not limited to the illustrated configuration and it is recognized that it may have various shapes, including a rectangular configuration with equivalent widths at each end.

A perimeter skirt 24 depends from the support surface 22 about a periphery thereof. In the illustrated embodiment, the skirt 24 extends about the narrow end 21, the lateral sides 25 and a portion of the wide end 23. A notch area 29 extends into the support surface 22 at the wide end 23 and creates a discontinuity of the skirt 24, however, a generally perpendicular rib 28 extends about the periphery of the notch 29 and interconnects at each end thereof with the skirt 24 (see FIG. 2), The notch 29 preferably facilitates access to controls 110 or the like which may be on the top or bottom surface of the radio unit 100.

The support surface 22 is supported by a plurality of ribs 26 extending substantially perpendicular to the support surface 22. The ribs 26 preferably extend to and support the perimeter skirt 24. The ribs 26 also interconnect with the rib 28 to provide an integrated support assembly for the support surface 22. The bottom edges of the skirt 24, ribs 26 and rib 28 define a contact plane 30 which is spaced from the support surface 22. With this configuration, the support surface 22, which may be supporting electrical components producing heat, is spaced away from the contact plane 30, which may be against the body of a soldier or the like wearing the mount system 10. This minimizes direct heat transmission from the electrical components to the wearer.

To further assist cooling of the electrical components, the support surface 22 preferably has a series of through passages 27 therethrough. As illustrated in FIG. 2, each through passage 27 is preferably bordered by a plurality of the ribs 26. In addition to the through passages 27, each lateral side 25 preferably defines a baffle 40. Each baffle 40 includes a series of upwardly extending ribs 42 with through passages 43 therebetween. The ribs 42 are configured to engage the sides of the radio unit 100 while the through passages 43 facilitate the passage of heat. Additionally, a blower fan unit 46 may be positioned between the ribs 26 on the underside of the base member 20. In the illustrated configuration, the blower fan unit 46 draws in cooler area from the notch area 29 and blows the air outward toward the lateral sides 25. The blower fan unit 46 may be powered by the battery adaptor output or the like. Since the convection heat transfer coefficient for gases is typically 10 times greater for forced convection than free convection, the blower fan unit 46 may greatly reduce heat buildup from the electrical components.

Figure 5:
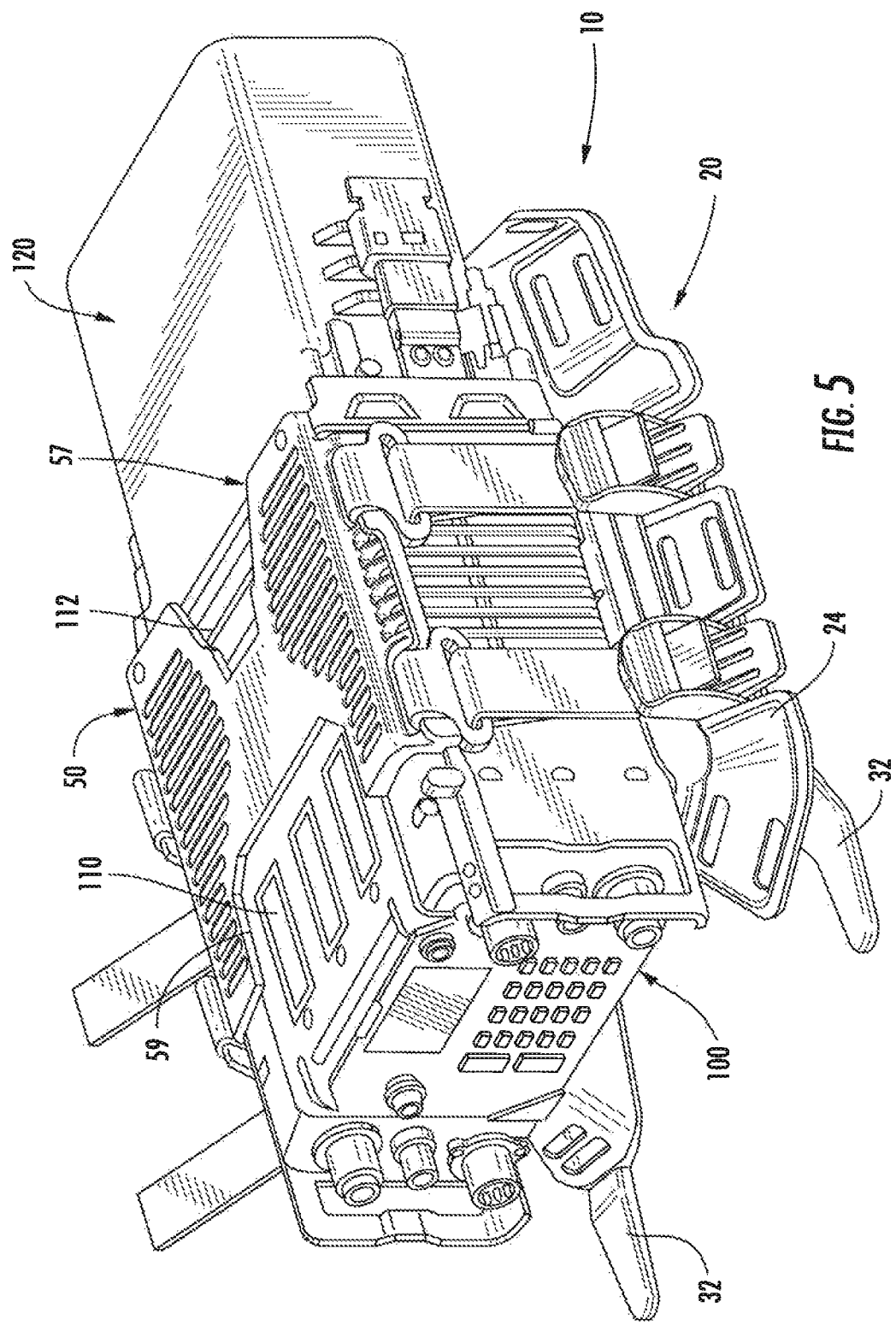
FIG. 5 is a perspective view of the mount system of FIG. 1 with optional feet attached thereto.

The base member 20 preferably defines various mechanisms for connection of the mount system 10 within a vehicle, on a backpack or on a solider or the like. In the illustrated embodiment, a first connection mechanism is defined by bores 31a extending into the support surface 22. As illustrated in FIG. 2, each bore 31a terminates in a base surface with a smaller through hole 31b. With this configuration, screws or the like (not shown) may be positioned with the screw head in the bore 31a and the screw shank extending through the through hole 31b for connection to a desired structure. As an alternative, connecting mechanisms in the form of feet 32 or the like (see FIG. 5) may be connected to the base member 20. The feet 32 extend outwardly from the skirt 24 and are configured to be received in a slot or the like. The feet may be connected with a nut and bolt assembly utilizing a corresponding bore 31a and through hole 31b. Another alternative connecting mechanism in the illustrated embodiment is provided in the form of slots 34 extending through the skirt 24 at various locations. The slots 34 are configured to receive clips, straps or the like to connect the base member 20 to a backpack, a uniform or other desired structure. The invention is not limited to the illustrated connection mechanisms and other connection mechanisms may also or alternatively be utilized.

Referring to FIG. 1, to maintain the radio unit 100 on the base member 20, the cover member 50 is adjustably connected to the base member 20 such that a radio receiving space is defined between the base member 20 and the cover member 50. The exemplary cover member 50 is manufactured from a nitrogen infused plastic, however, other rigid and semi-rigid materials may be utilized. One exemplary configuration of adjustably connecting the cover member 50 will be described hereinafter. The cover member 50 generally comprises a plate member 52 extending from a battery end 51 to a radio end 53 with lateral sides 55 extending therebetween. Notches 57 and 59 may be defined into the respective ends of the plate member 52 and facilitate access to controls 110, 112 or the like which may be on the top or bottom surface of the radio unit 100 (see FIG. 5). As an engagement to minimize longitudinal movement of the radio unit 100, the base support surface 22 may include upwardly extending posts 39 while the plate member 52 includes downwardly extending posts 69. The posts 39 and 69 are configured to engage in recesses on the radio unit 100 and lock the position thereof relative to the base member 20 and the cover member 50.

To assist cooling of the electrical components, the plate member 52 preferably has a series of through passages 61 therethrough. In addition to the through passages 61, each lateral side 55 preferably defines a baffle 60. Each baffle 60 includes a series of downwardly extending ribs 62 with through passages 63 therebetween. The ribs 62 are configured to engage the sides of the radio unit 100 while the through passages 63 facilitate the passage of heat.

Figure 4:
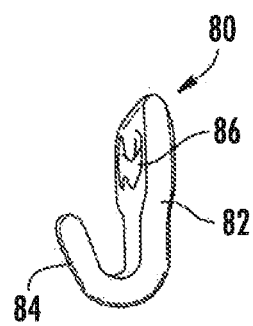
FIG. 4 is a side elevation view of an exemplary flat hook of the mount system of FIG. 1.

To interconnect the cover member 50 to the base member 20, the illustrated mount system 10 includes four adjustable straps 90. The exemplary straps 90 include a flat hook 80 secured to one end via a seam 92 and a free end 94. Referring to FIG. 4, each flat hook 80 includes a body 82 with a hook 84 at one end and a strap receiving slot 86 at the other end. Each hook 84 is configured to be received in a corresponding slot 66 along a respective lateral side 55 of the plate member 52. While the illustrated straps 90 include flat hooks 80, it is recognize that the straps may be directly passed through and connected about the slot 66 without the hook 80. Additionally, other mechanisms may be utilized to connect the strap 90 to the plate member 50.

Figure 3:
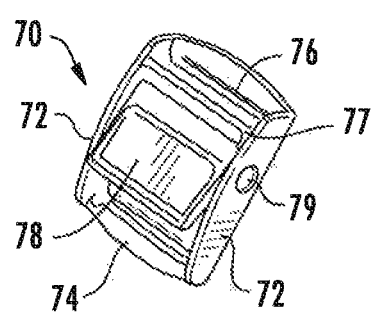
FIG. 3 is a perspective view of an exemplary cam buckle of the mount system of FIG. 1.

The free end 94 of each strap 90 is passed through a respective cam buckle 70 attached to the base member 20. Referring to FIG. 3, each exemplary cam buckle 70 includes a pair of side walls 72 with a lower crossbar 74 and an upper crossbar 76. A clasp 78 is pivotally connected to the side walls 72 at pivot 79 and a strap passage 77 is defined between the clasp 78 and the upper crossbar 76. The clasp 78 is preferably biased to a closed position.

With reference to FIGS. 1 and 2, in the exemplary mount system 10, the skirt 24 defines a pair of slots 47 to receive the side walls 72 of a respective cam buckle 70. On the underside of the skirt 24, a channel 49 extends between the slots 47 and is configured to snap fittingly receive the lower crossbar 74 of the respective cam buckle 70. The crossbars 74 are preferably received such that the buckle 70 is pivotal relative to the base member 20 over a limited range. While the illustrated embodiment includes a fixed end connected to the cover member 50 and buckle 70 connected to the base member 20, it is understood that the configuration may be switched such that the strap is fixed to the base member 20 and the buckle is attached to the cover member 50.

With the free end 94 of the strap 90 passing through the cam buckle 70, the strap 90 may be loosened by disengage the clasp 78 or tightened by pulling the free end 94 away from the buckle 70. When a radio unit or the like is not mounted within the mount system 10, the straps 90 may be adjusted such that the cover member 50 is adjacent the support surface 22 to minimize the size of the mount system 10 for storage and transport.

While the illustrated straps 90 are adjustable utilizing a cam buckle 70, it is recognized that other types of buckles may be utilized. It is further recognized that the straps may be adjustable be other means, for example, the straps may be elastic and fixed to both the cover member 50 and the base member 20. Furthermore, while straps are utilized in the exemplary mount system 10, other connecting members may be utilized, for example, elastic bands, threaded connectors or snap clips. As yet another alternative, the cover member may be eliminated and the radio otherwise connected to the base member 20, for example, by connecting at least one continuous strap from one lateral side 25 of the base member 20 to the other lateral side 25 of the base member 20.

Figure 7:
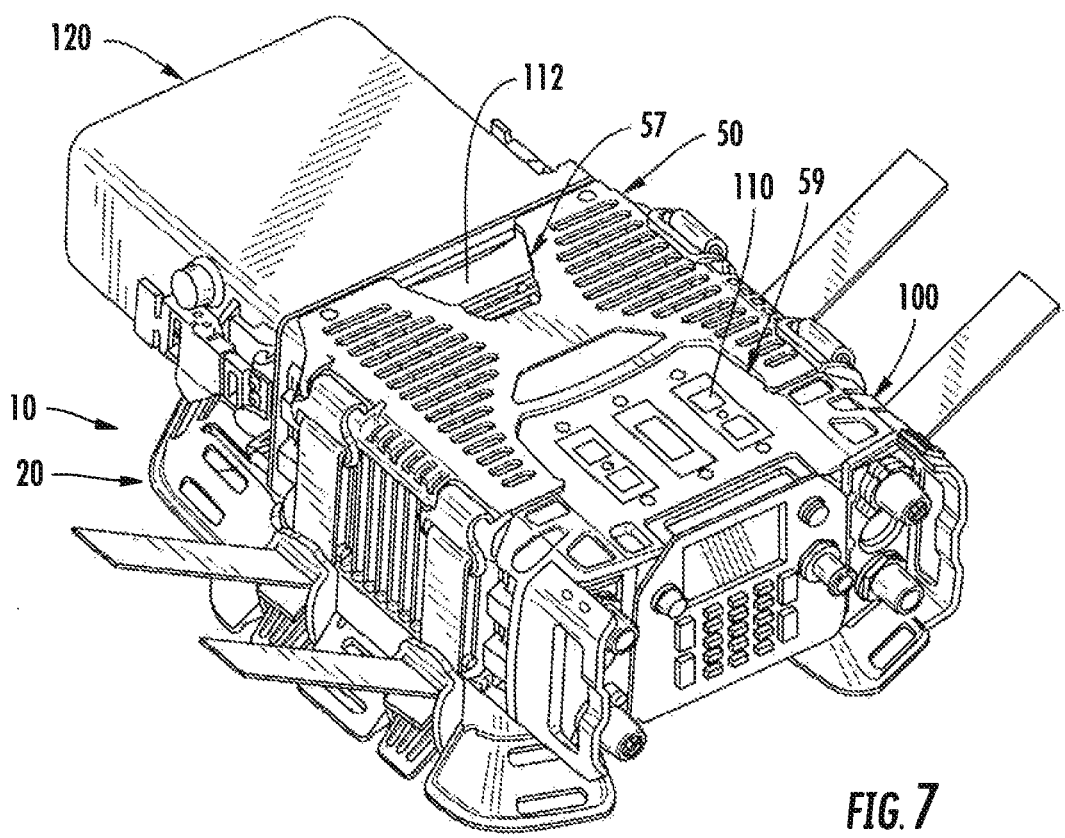
FIG. 7 is a perspective view similar to FIG. 6 with the exemplary radio and battery positioned in the mount system in a second orientation.

Having generally described the components of the exemplary mount system 10, the variety of mounting configurations/orientations of a radio unit 100 relative to the mount system 10 will be described with respect to FIGS. 6-9. FIGS. 6 and 7 each illustrate a radio unit 100 connected to a battery 120, In FIG. 6, the radio unit 100 is positioned within the mount system 10 in a first orientation as indicated by the radio display 102 being adjacent to the base member 20. In FIG. 7, the radio unit 100 is mounted in the opposite orientation wherein the radio display 102 is adjacent the cover member 50. The mount system 10 accommodates both orientations, providing greater flexibility to the user.

Figure 9:
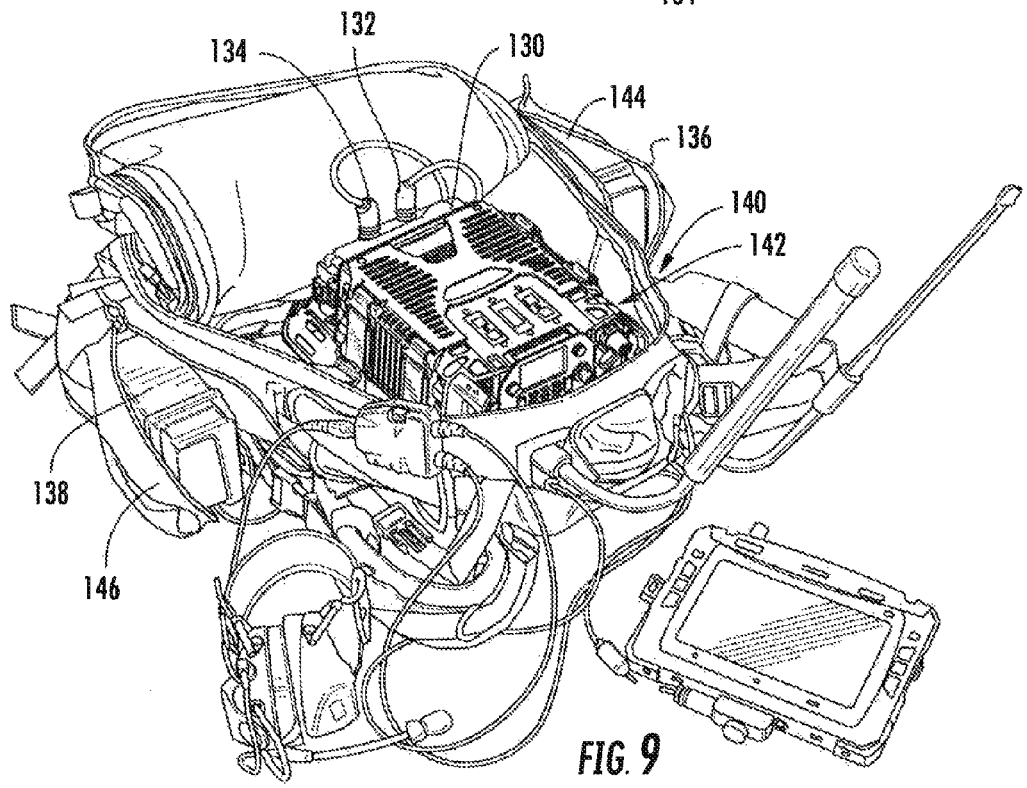
FIG. 9 is a perspective view of the assembly of FIG. 8 positioned in a backpack with the battery eliminator attached to an alternative power source.

FIGS. 8 and 9 illustrate a radio unit 100 with a battery eliminator 130. As seen in FIG. 8, the battery eliminator 130 is clear of the battery snubber 136 as such is addressed through alternative circuitry. The mount system 10 does not interfere with the wires 132, 134 extending from the battery eliminator 130. As illustrated in FIG. 9, the radio unit 100 may be positioned within a pouch 142 of a backpack 140 with the mount system 10 mounted thereon while the wires 132, 134 may still be routed to components 136, 138 in side pouches 144, 146, respectively. Again, the mount system 10 provides flexibility to the user.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

We claim:

1. A mount system for a portable radio, the mount system comprising:
    a base member formed of a rigid material defining a support surface with a perimeter, the support surface comprising a planar face including two opposing lateral sides which extend longitudinally from a wide end of the support surface to a narrow end of the support surface, said lateral sides configured so that the support surface is bilaterally transitioned at an intermediate location of said support surface from a wider lateral width at the wide end to a more narrow lateral width at the narrow end;
    the support surface including a notched area at the wide end, the notched area defined by a major portion of the perimeter extending at said wide end between the two opposing lateral sides, said major portion including opposing perimeter sections which extend longitudinally in a direction towards the narrow end;
    a skirt outwardly flared from the perimeter, the skirt extending around the narrow end and around a portion of the perimeter at the wide end exclusive of the notched area, the skirt extending transversely relative to the support surface a predetermined distance to a contact plane of said base member which is opposed to the support surface;
    a plurality of ribs extending from the support surface to the contact plane which maintain the support surface in spaced relation to the contact plane and support the skirt, the plurality of ribs having spaces therebetween through which air can flow to facilitate the transfer of heat through the base member;
    a cover member including a plate member interconnected to the base member in a parallel arrangement by at least one adjustable connection element, where a first end of the adjustable connection element is coupled to the plate member and a second end of the adjustable connection element is coupled to the base member, said plate member disposed at a location which is opposed from the wide end of the base member to define a receiving space for the portable radio between the support surface and the plate member, and having formed therein a plurality of slots or through passages which extend through the plate member to facilitate the passage of heat through the plate member;
    wherein the contact plane against which a person or object can directly abut is spaced apart from the support surface so that direct heat transmission from the portable radio to the person or object is limited; and
    wherein the adjustable connection element facilitates an adjustment of the receiving space that is defined between the plate member and the support surface.

2. The mount system according to claim 1, wherein the cover member is adjustably interconnected to the base member such that a distance between the support surface and the plate member is adjustable.

3. The mount system according to claim 2, wherein the adjustable connection element comprises at least two adjustable straps interconnecting the cover member to the base member.

4. The mount system according to claim 3, wherein each adjustable strap includes a first end interconnected to one of the cover member and the base member and a second end of the adjustable strap is passed through a buckle on the other of the cover member and the base member.

5. The mount system according to claim 3, wherein each adjustable strap is defined by an elastomeric strap connected at a first end to the base member and at a second end to the cover member.

6. The mount system according to claim 1, wherein the connecting mechanism includes at least one bore extending through the support surface and terminating in a screw receiving bore.

7. The mount system according to claim 1, wherein the connecting mechanism includes at least one slot defined through the skirt.

8. The mount system according to claim 1, wherein the connecting mechanism includes at least one foot connected to the base member and extending outwardly beyond the skirt.

9. The mount system according to claim 1, wherein the plurality of ribs interconnect with the skirt.

10. The mount system according to claim 1, wherein at least one through hole extends through the base member, the cover member or both the base member and the cover member.

11. The mount system according to claim 1, wherein at least one baffle is defined along the perimeter of the support surface, the baffle including a plurality of upwardly extending ribs with through passages defined therebetween that facilitate the passage of air through the support face along at least one of the two opposing lateral sides of the support surface, the upwardly extending ribs extending from the support face in a direction toward said cover member and away from the contact plane, the ribs configured to engage a side of the portable radio.

12. The mount system according to claim 1, wherein at least one baffle is defined along a lateral side of the plate member, the baffle including a plurality of downwardly extending ribs with through passages defined therebetween that facilitate the passage of air through at least one lateral edge portion of plate member, the downwardly extending ribs extending from the plate member in a direction toward said support surface and configured to engage a side of the portable radio.

13. The mount system according to claim 1, wherein a battery snubber is defined on the support surface.

14. The mount system according to claim 1, wherein a blower fan unit is supported on an underside of the support surface disposed between the plurality of ribs which extend from the support surface to the contact plane.

15. A mount system for a portable radio, the mount system comprising:
- a base member formed of a rigid material defining a support surface with a given perimeter, the support surface comprising a planar face including two opposing lateral sides which extend longitudinally from a wide end of the support surface to a narrow end of the support surface, said lateral sides configured so that the support surface is bilaterally transitioned at an intermediate location of said support surface from a wider lateral width at the wide end to a more narrow lateral width at the narrow end;
- the support surface including a notched area at the wide end, the notched area defined by a major portion of the perimeter extending at said wide end between the two opposing lateral sides, said major portion including opposing perimeter sections which extend longitudinally in a direction towards the narrow end;
- a skirt outwardly flared from the perimeter, the skirt extending around the narrow end and around a portion of the perimeter at the wide end exclusive of the notched area, the skirt extending transversely relative to the support surface a predetermined distance to a contact plane of the base member which is opposed to the support surface;
- a plurality of ribs extending from the support surface to the contact plane which maintain the support surface in spaced relation to the contact plane and support the skirt, the plurality of ribs having spaces therebetween through which air can flow to facilitate the transfer of heat through the base member;
- a connection assembly configured to connect the portable radio to the support surface, the connection assembly comprising a cover member adjustably interconnected to the base member in a parallel arrangement by at least one adjustable connection element, where the adjustable connection element facilitates an adjustment of a radio receiving space that is defined between the base member and the cover member; and
- wherein said cover member includes a plate disposed at a location which is opposed from the wide end of the base member to define a receiving space for the portable radio between the support surface and the plate, and having formed therein a plurality of slots or through passages which extend through the plate to facilitate the passage of heat through the plate.

16. The mount system according to claim 15, wherein the adjustable connection element comprises at least two adjustable straps interconnecting the cover member to the base member.

17. The mount system according to claim 15, wherein at least one connecting mechanism is defined by the base member.

* * * * *